(12) United States Patent
Cho et al.

(10) Patent No.: US 10,581,906 B2
(45) Date of Patent: Mar. 3, 2020

(54) SECURITY SYSTEM FOR ELECTRONIC EQUIPMENT

(71) Applicant: Intel Corporation, Santa Clara, CA (US)

(72) Inventors: Kyong-Tak Cho, Ann Arbor, MI (US); Li Zhao, Beaverton, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 15/450,650

(22) Filed: Mar. 6, 2017

(65) Prior Publication Data

US 2018/0091550 A1    Mar. 29, 2018

Related U.S. Application Data

(60) Provisional application No. 62/401,145, filed on Sep. 28, 2016.

(51) Int. Cl.
*H04L 29/06* (2006.01)
*B60R 16/023* (2006.01)
(Continued)

(52) U.S. Cl.
CPC ...... *H04L 63/1466* (2013.01); *B60R 16/0232* (2013.01); *G01R 19/04* (2013.01);
(Continued)

(58) Field of Classification Search
None
See application file for complete search history.

(56) References Cited

U.S. PATENT DOCUMENTS 6,484,082 B1    11/2002    Millsap et al.
6,600,723 B1 *   7/2003    Reeb ............... B60R 16/0315
                                                  361/90

(Continued)

FOREIGN PATENT DOCUMENTS

JP    2014-108695 A    6/2014

OTHER PUBLICATIONS

Cho, K.T., et al.: "Fingerprinting Electronic Control Units for Vehicle Intrusion Detection", Proceedings of the 25th USENIX Security Symposium, Aug. 10-12, 2016, USENIX, Austin, TX, USA, pp. 911-927.

(Continued)

*Primary Examiner* — Henry Tsai
*Assistant Examiner* — Aurangzeb Hassan
(74) *Attorney, Agent, or Firm* — Grossman, Tucker, Perreault & Pfleger, PLLC

(57) ABSTRACT

One embodiment provides an electronic control unit (ECU) for a vehicle. The ECU includes transceiver circuitry, voltage measurement circuitry and feature set circuitry. The transceiver circuitry is to at least one of send and/or receive a message. The voltage measurement circuitry is to determine at least one of a high bus line voltage (VCANH) value and/or a low bus line voltage (VCANL) value, for each zero bit of at least one zero bit of a received message. The received the message includes a plurality of bits. The feature set circuitry is to determine a value of at least one feature of a feature set based, at least in part, on at least one of a high acknowledge (ACK) threshold voltage (VthH) and/or a low ACK threshold voltage (VthL). The feature set includes at least one of an operating most frequently measured VCANH value (VfreqH2) of a number of VCANH values and/or an operating most frequently measured VCANL value (VfreqL2) of a number of VCANL values.

19 Claims, 5 Drawing Sheets

(51) Int. Cl.
    *G01R 19/04*     (2006.01)
    *G01R 19/165*    (2006.01)
    *H04L 5/00*      (2006.01)
    *H04L 12/40*     (2006.01)
    *B60R 25/20*     (2013.01)

(52) U.S. Cl.
    CPC ...... *G01R 19/16533* (2013.01); *H04L 5/0055* (2013.01); *H04L 12/40026* (2013.01); *B60R 25/20* (2013.01); *H04L 2012/40215* (2013.01); *H04L 2012/40273* (2013.01)

(56) References Cited

U.S. PATENT DOCUMENTS

| | | | |
|---|---|---|---|
| 8,914,184 B2 * | 12/2014 | McQuade | F02D 29/02 |
| | | | 701/29.1 |
| 2012/0072066 A1 * | 3/2012 | Kato | B60K 6/365 |
| | | | 701/22 |
| 2014/0032800 A1 | 1/2014 | Peirce et al. | |
| 2015/0089236 A1 | 3/2015 | Han et al. | |
| 2016/0198485 A1 | 7/2016 | Yousefi et al. | |
| 2017/0313206 A1 * | 11/2017 | Yamamoto | B60L 50/16 |
| 2018/0336338 A1 * | 11/2018 | Hofman | G06F 21/44 |

OTHER PUBLICATIONS

International Search Report and Written Opinion issued in PCT Application No. PCT/US2017/048927, dated Nov. 24, 2017, 18 pages.

\* cited by examiner

SECURITY SYSTEM FOR ELECTRONIC EQUIPMENT

CROSS-REFERENCE TO RELATED APPLICATIONS

The present non-provisional application claims the benefit of U.S. Provisional Patent Application Ser. No. 62/401,145, filed Sep. 28, 2016, the entire disclosure of which is incorporated by reference.

FIELD

The present disclosure relates to a security system for electronic equipment, and in particular to, a security system for vehicle electronic control systems.

BACKGROUND

"Electronic Control Unit" (ECU) is a generic term for an embedded system that controls an electrical system and/or subsystems in a transport vehicle. Transport vehicles may include, for example, automobiles, aircraft, trains, busses, etc. In a vehicle, the ECUs may be interconnected via a network, e.g., a bus. The ECUs may be configured to transmit and/or receive messages that contain commands and/or data.

ECUs may be susceptible to cyber attacks. A compromised ECU may be utilized by an attacker to inject a malicious message into the vehicle network. The malicious message may, in turn, cause another ECU to operate in a manner unintended by a vehicle and/or ECU designer.

The message format for some bus protocols do not contain a source identifier. In other words, such messages do not contain an ECU identifier that corresponds to the ECU that transmitted a particular message. This lack of a source identifier can make identifying a compromised ECU, that may be the source of a malicious message, difficult.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

DETAILED DESCRIPTION

Figure 1:
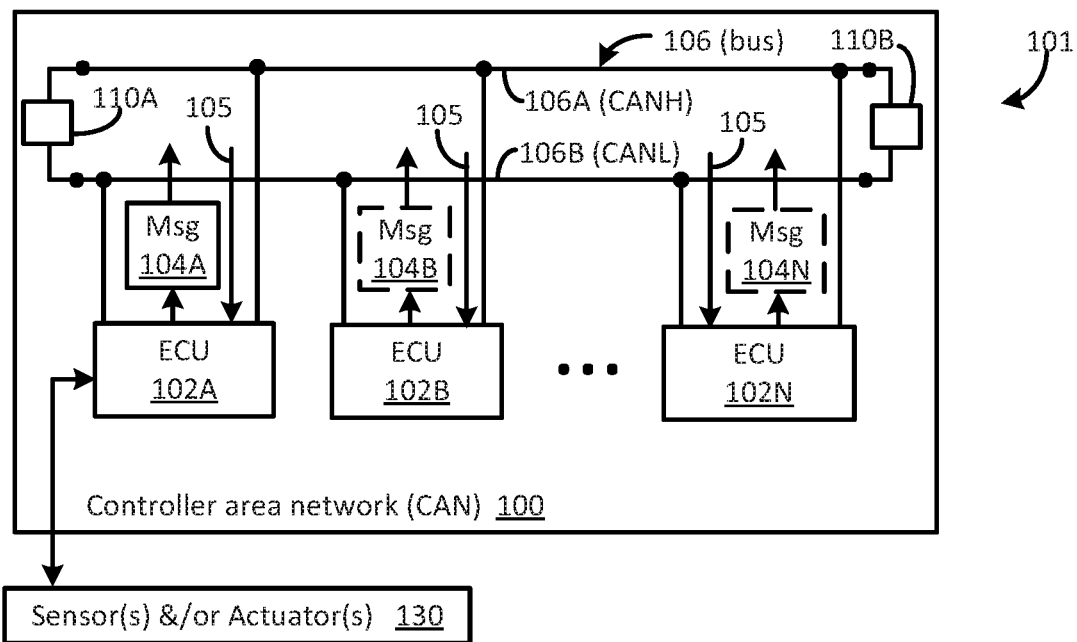
FIG. 1 illustrates a system containing a controller area network (CAN) in accordance with at least one embodiment described herein.

Generally, this disclosure provides apparatus, systems, and methods for determining a signature of an electronic control unit (ECU) for a vehicle and, identifying the ECU based, at least in part, on the signature. Vehicles may include, but are not limited to, automobiles, trains, buses, aircraft, etc. The vehicle may include a plurality of ECUs coupled by a network, i.e., a vehicle communication bus. The signature is related to one or more bus voltages detected at a receiving ECU, also coupled to the bus, when a selected ECU is transmitting a message on the bus. The signature may then be utilized by a receiving ECU to identify the transmitting ECU.

The bus voltages may be utilized to determine values of one or more features of a feature set. The feature set, including feature values, may then correspond to the signature of the transmitting ECU. The feature set may then be input to classifier circuitry configured to identify the transmitting ECU based, at least in part, on the values of the features in the feature set.

It may then be determined whether the message corresponds to a legitimate transmission from the identified ECU. For example, in a controller area network (CAN) bus protocol, each ECU may only legitimately transmit a unique subset of possible messages and each message contains a unique (respective) message identifier. This information may be utilized to facilitate authenticating a received message, i.e., when determining whether or not the received message was legitimately transmitted by the identified transmitting ECU.

Generally, only one ECU may be transmitting on the bus after winning arbitration. Thus, bus signal levels, e.g., voltages, detected by receiving ECU(s) correspond to the transmitting ECU and may be utilized to identify the transmitting ECU, as described herein. An exception, in the case of the CAN bus protocol, is an acknowledge (ACK) bit in a CAN bus protocol message frame. A logic zero ACK may be transmitted by one or more receiving ECUs during transmission of the corresponding message by the transmitting ECU. Thus, bus voltages associated with the ACK bit may not represent the transmitting ECU and may interfere with identifying the transmitting ECU.

The apparatus, method and system provided herein are configured to determine at least one ACK threshold voltage based, at least in part, on a plurality of received zero bit voltages. The ACK threshold voltage(s) may then be utilized to filter out received voltages associated with ACK bits. Filtering out the voltages associated with the ACK bits is configured to enhance the accuracy of the signature of the transmitting ECU and of the authentication of a source (i.e., transmitting) ECU for a selected received message.

In some embodiments, values of selected features in the feature set (i.e., signature) may be updated during operation to account for variation, over time, of characteristics of the transmitting ECU transceiver, as will be described in more detail below. Such updating is configured to facilitate adaptive learning during operation of the ECUs in the vehicle.

In the following, utilizing both high bus line voltages (e.g., VCANH) and low bus line voltages (e.g., VCANL) and their respective associated features to authenticate a received message are described. It should be noted that utilizing high bus line voltages and their associated features, low bus line voltages and their associated features or both high and low bus line voltages and their respective features, to determine a signature for authenticating a received message are equally contemplated herein.

FIG. 1 illustrates a system 101 containing a controller area network (CAN) 100 in accordance with at least one embodiment described herein. The network 100 includes a plurality of ECUs 102A, 102B . . . 102N, each coupled to a bus 106. During in-vehicle operation, each ECU, for example ECU 102A, may be configured to receive inputs from one or more sensor(s) and/or to provide control outputs to one or more actuators, e.g., sensor(s) and/or actuator(s) 130. For example, sensors may include temperature sensors, pressure sensors, accelerometers, etc. In one example, operation of a selected ECU may be in response to a message received from another ECU, the message communicated via bus 106. In another example, a selected ECU may be configured to transmit a message to another ECU via bus 106.

Each ECU 102A, 102B, . . . , 102N is generally configured to provide control over some aspect of a vehicle, for example, Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), etc. In some situations, one ECU may include one or more ECUs of one or more types. Thus, the ECUs 102A, 102B, . . . , 102N may be configured to transmit messages on the bus 106 and/or receive messages from other ECUs via the bus 106.

Each message and/or bus 106 may comply and/or be compatible with one or more communication bus protocols. In one example embodiment, the bus 106 may comply with a standard vehicle bus protocol, e.g., CAN bus protocol. In this example embodiment, bus 106 corresponds to a two wire bus including a first conductor 106A (CANH) and a second conductor 106B (CANL). CANH 106A corresponds to a high bus line and CANL 106B corresponds to a low bus line. The bus 106 may be terminated at each end by, for example, impedance matching resistors 110A, 110B. Of course, in other embodiments, the bus 106 may comply, or be compatible, with other fixed-length bus protocols which may include, for example, other standard and/or proprietary bus protocols, e.g., J1850, as described herein.

During operation, each ECU 102A, 102B, . . . , 102N may transmit, i.e., broadcast, one or more messages 104A, 104B, . . . , 104N, respectively, defined by an aforementioned bus (e.g., CAN bus) protocol. The broadcast message, for example message 104A, may then be received by each ECU as received message 105. The messages 104A, 104B, . . . , 104N may generally include a message-type identifier (message ID) field and a data field. The message ID provides a message priority that is used by each ECU for nondestructive arbitration. In other words, if a plurality of ECUs attempt to transmit at the same time, ECUs transmitting lower priority messages are configured to cease transmission and to try again later. A plurality of ECUs may not transmit a same message, thus, each ECU, for example, ECU 102A, is configured to transmit a unique subset of possible messages.

According to the CAN protocol, while the format of messages 104A, 104B, . . . , 104N includes respective message identifiers, the format does not include source identifier information. Thus, ECUs receiving message 105 cannot verify the integrity of the source based solely on the format of the message 105. In other words, ECU 102B, that receives message 105, is unable to authenticate the source of the message based only on the message ID and the contents, i.e., bit sequence, of the received message 105.

Figure 2A:
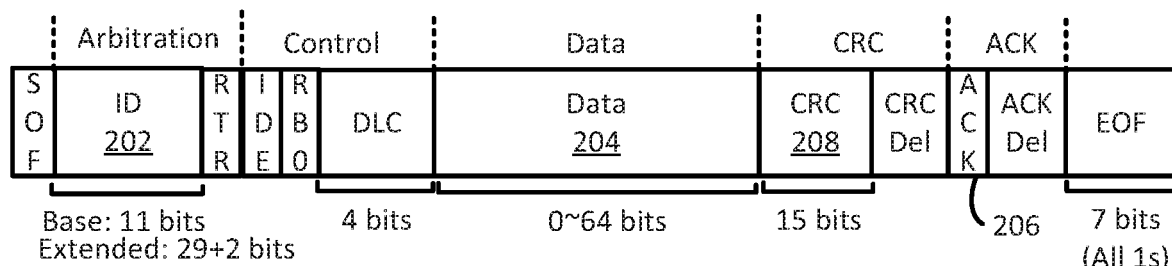
FIG. 2A illustrates one example controller area network (CAN) bus message format (i.e. "message frame") in accordance with at least one embodiment presented herein.

FIG. 2A illustrates one example controller area network (CAN) bus message format (i.e., "message frame") 200A, in accordance with at least one embodiment presented herein. Message frame 200A contains, among other fields, an arbitration field (that includes a message identifier (ID) 202) and an acknowledge field that includes an acknowledge (ACK) bit 206. Depending on the message, message frame 200A may include a data field 204. Message frame 200A further includes a cyclic redundancy check (CRC) field 208.

The message 200A may, for example, represent transmitted message 104A and/or corresponding received message 105. The message ID 202 may contain 11 bits or 29 plus 2 bits. The message ID 202 corresponds to both the message priority as well as a message function. In other words, each message ID indicates both the message priority as well as the message function. The message ID is thus configured to be utilized during arbitration to give preference to a higher priority message. According to the CAN bus protocol, for example, a relatively higher priority message has a relatively smaller message ID value. Thus, while the message ID 202 may contain information pertaining to what the message is about (e.g., a binary code used to refer to "tire pressure"), the message ID 202 may not contain an ECU identifier identifying the actual ECU sending the message. Data field 204 may then contain the actual data of the message itself (e.g., a code representing "tire pressure is 25 psi"). ACK 206 is a single bit and may be sent by all ECUs that receive a message, as described herein.

Thus, each message that complies with CAN bus protocol, e.g., message 200A, contains a plurality of bits arranged in a plurality of fields. Each field contains at least one bit, with each bit corresponding to a logic 0 ("zero bit") or a logic 1 ("one bit").

Physically, for a 2-wire bus, each bit may be represented by a differential voltage applied across the bus. In the CAN bus protocol, for example, a first wire (i.e., conductor) is labeled CANH (i.e., high bus line) and a second wire is labeled CANL (i.e., low bus line). A transmitting ECU is configured to apply a first voltage (i.e., high bus line voltage), VCANH, to CANH and a second voltage (i.e., low bus line voltage), VCANL, to CANL in order to transmit a bit. In the CAN bus protocol, a 0 bit is considered "dominant" and a 1 bit is considered "recessive". In other words, a transmitting ECU is configured to actively drive the CANH and CANL lines to respective voltages to transmit a 0 bit and to passively pull (up and/or down) the CANH and CANL lines to respective voltages to transmit a 1 bit. Thus, if a first ECU is transmitting a 0 bit and a second ECU is transmitting a 1 bit, then the bus state will correspond to the 0 bit. This configuration allows nondestructive arbitration and collision avoidance. In other words, according to the CAN bus protocol, the second ECU will detect a bus state different from its transmitted bit and will halt transmission.

Figure 2B:
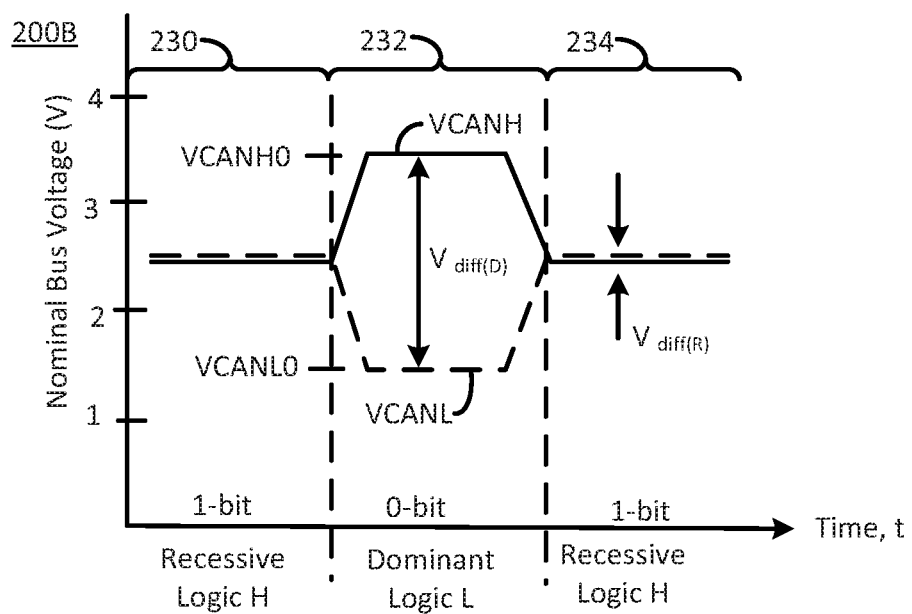
FIG. 2B is a plot illustrating nominal recessive and dominant bus voltages for a CAN bus in accordance with at least one embodiment presented herein.

FIG. 2B is a plot 200B illustrating nominal recessive and nominal dominant bus voltages for a CAN bus in accordance with at least one embodiment presented herein. When an ECU sends a 0 bit, it does so by increasing a first voltage (VCANH coupled to CANH) to VCANH0 and decreasing a second voltage (VCANL coupled to CANL) to VCANL0. For example, VCANH0 may be about 3.5V, while the VCANL0 may be about 1.5V.

Plot 200B includes three regions 230, 232, 234 of CAN bus voltages VCANH and VCANL. A first region 230 and a third region 234 correspond to the CAN bus in the recessive state. In the recessive state, either the CAN bus is idle or an ECU is transmitting a logic 1, i.e., a one bit. A second region 232 corresponds to the CAN bus in the dominant state. In the dominant state, at least one ECU is transmitting a logic 0, i.e., a zero bit. Thus, a differential voltage detected across the CANH and CANL lines during the dominant state corresponds to Vdiff(D)=VCANH0−VCANL0, and a differential voltage detected across the CANH and CANL lines during the recessive state corresponds to Vdiff(R).

For example, a 0 bit may correspond to VCANH nominally equal to 3.5V (VCANH0) and VCANL nominally equal to 1.5V (VCANL0), on CANH and CANL, respectively. However, due to process variations in the transistors and diodes within the ECUs' transceivers, when sending a 0 bit, each transmitter may output voltages that differ from the nominal values. For example, the actual output voltages for a number of ECUs may have a distribution, e.g., a Gaussian distribution, with a corresponding mean value and a corresponding standard deviation. These variations in CANH and CANL voltage outputs per transmitter may be utilized to determine a unique signature for each transmitter and, thus, each ECU. The unique signatures may then be used to identify a transmitting ECU, as will be described in more detail below.

Turning again to FIG. 2A, the acknowledge (ACK) bit 206 is positioned in an ACK slot, i.e., ACK time interval. ECUs that are receiving a transmitted message are configured to transmit a 0 bit during the ACK slot of the transmitted message. Thus, VCANH and VCANL, detected during the ACK slot, are related to a combination of ACK bit transmissions of the receiving ECUs rather than solely the transmitting ECU. If a plurality of ECUs acknowledge the transmitted message, VCANH detected during the ACK may generally be greater than VCANH0 of the transmitting ECU and VCANL detected during the ACK may generally be less than the VCANL0 of the transmitting ECU. In other words, when a plurality of ECUs are transmitting an ACK zero bit, their respective drive transistors may be coupled in parallel between a supply voltage and a bus line, e.g., between a high side supply voltage configured to drive transistors coupled to CANH and between a low side supply voltage configured to drive transistors coupled to CANL. Thus, the ON resistances of the drive transistors are coupled in parallel, reducing the resistance between the supply in the bus line. The CANH bus line voltage may then be relatively closer to the supply voltage of the high side drive transistors and the CANL bus line voltage may then be relatively closer to the supply voltage of the low side drive transistors. This information may be utilized to account for the ACK CANH and CANL voltages when determining the ECU signatures, as will be described in more detail below.

It may be appreciated that the bits included in at least the message ID 202 may contain a number of zero bits and a number of one bits. For example, an 11-bit message ID 202 may contain at most 11 zero bits and an extended message ID may contain up to 29 zero bits. Similarly, the data field 204 may contain up to 64 zero bits and the CRC field 208 may contain up to 15 zero bits. In contrast, the ACK field 206 may contain at most one zero bit. Thus, each zero bit received by an ECU is relatively more likely to correspond to a non-ACK bit transmitted by one ECU ("transmitting ECU") rather than an ACK bit transmitted by one or more receiving ECUs. For example, for a 120 bit message, with equally likely 0 and 1 bits, the likelihood that a zero bit is an ACK bit is 1/(120/2)≈1.7%. Thus, for a received message, relatively more frequently captured CAN bus voltage values VCANH, VCANL likely correspond to non-ACK bits transmitted by one ECU rather than an ACK bit transmitted by one or more other receiving ECUs.

Figure 3:
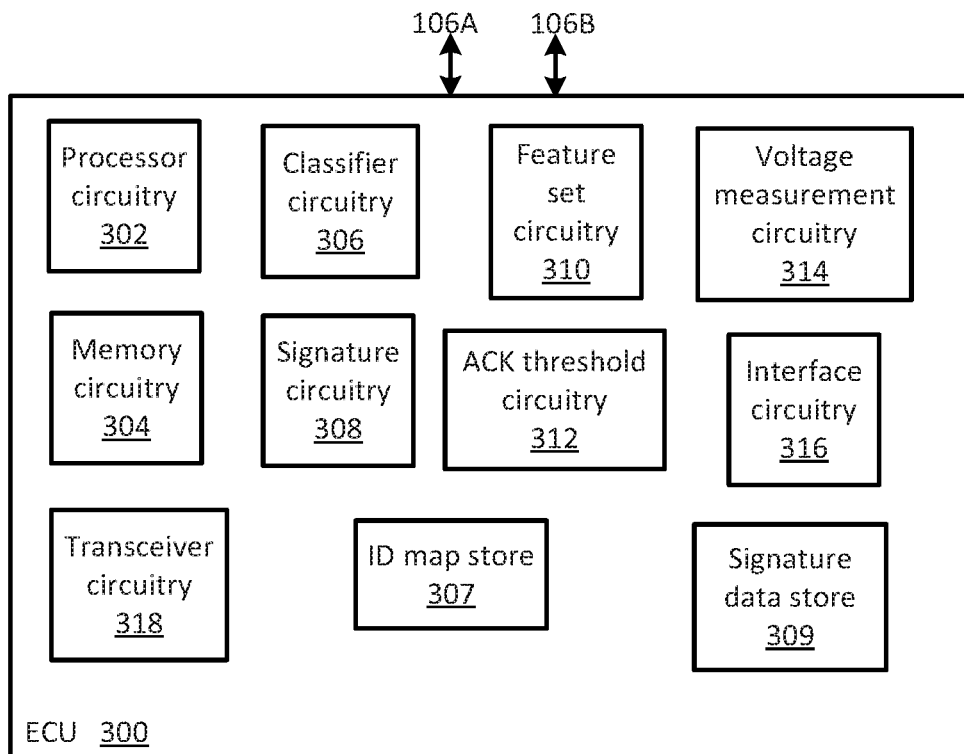
FIG. 3 illustrates an electronic control unit (ECU) in accordance with at least one embodiment herein.

FIG. 3 illustrates an ECU 300 in accordance with at least one embodiment herein. The example ECU 300 depicted in FIG. 3 may represent, for example, an ECU 102A, 102B, . . . , or 102N of FIG. 1. ECU 300 generally includes processor circuitry 302, memory circuitry 304, classifier circuitry 306, an identifier (ID) map store 307, signature circuitry 308, a signature data store 309, feature set circuitry 310, ACK threshold circuitry 312, voltage measurement circuitry 314, interface circuitry 316 and transceiver circuitry 318. Interface circuitry 316 may include, for example, one or more of analog to digital converter (ADC) circuitry, digital to analog converter (DAC) circuitry, multiplexer circuitry, etc.

ECU 300 is coupled to CAN bus 106, depicted as a two-wire bus that includes the high signal line CANH 106A and the low signal line CANL 106B. It should be understood that ECU 300 exchanges messages with other ECUs (not shown in this FIG. 3) via the CAN bus 106. As will be described in greater detail below, ECU 300 is generally configured to identify the source of a message received from another ECU (i.e., a transmitting ECU) based, at least in part, on a signature and based, at least in part, on message ID to ECU ID mapping included in ID map store 307.

In some embodiments, ECU 300 may be designated as a "master" ECU for identifying each other ECU coupled to the bus 106. In these embodiments, authentication operations may be centralized on the master ECU. The master ECU may be configured to determine a respective signature for each transmitting ECU and to train (as will be described in more detail below) a corresponding classifier. The master ECU may then be configured to identify any transmitting ECU during operation of the vehicle to perform authentication. As used herein, "authentication" means verification of identification of a transmitting ECU by a receiving ECU.

In other embodiments, each ECU in the system may be similarly configured as ECU 300. In these embodiments, authentication operations may be distributed across a plurality of ECUs. In these other embodiments, each receiving ECU may be configured to determine a respective signature for each transmitting ECU configured to transmit messages to that receiving ECU. In other words, each ECU may be configured to receive messages from one or more other ECUs. The other ECUs may correspond to at least a subset of all ECUs in the system. In these embodiments, each receiving ECU may then be configured to train a classifier for each corresponding transmitting ECU and to then authenticate a transmitting ECU during operation of the vehicle, as described herein. Thus, a receiving ECU configured to receive messages from a subset of ECUs may be configured to develop a corresponding subset of the classifiers developed by the master ECU, as described herein.

Processor circuitry 302 is capable of executing machine-readable instructions and may take the form of any of a number of possible processors, such as an Intel® Atom processor, an Intel® Quark processor, etc. Memory circuitry 304 is capable of storing computer-readable instructions and/or data. Memory circuitry 304 may include volatile and/or nonvolatile memory. For example, memory circuitry 304 may be configured to contain signature data store 309.

Transceiver circuitry 318 is generally configured to send/receive messages to/from, for example, other ECUs. Thus, transceiver circuitry 318 may include a transmitter and a receiver configured to transmit or receive electrical signals carried by bus 106. The messages sent or received by transceiver circuitry 318 may be in the form of an electric signal, e.g., one or more voltages. A received message (such as message 105) may be converted from an analog voltage into a digital form by interface (e.g., ADC) circuitry 316. Voltage measurement circuitry 314 may capture the output (i.e., a digital value) from the interface circuitry 316 and determine (i.e., measure) the voltage(s) corresponding to one or more bits of the received message. These measured voltages may be used to create, update or verify a signature of the ECU sending the message, as will be explained in further detail below.

The following may be best understood when FIGS. 1 and 3 are considered together. In order to identify a transmitting ECU based, at least in part, on a received message, classifier circuitry 306, included in one or more ECUs, may be trained using supervised training techniques. Signature circuitry 308 may be configured to manage training operations. Training is configured to occur during operation of ECUs 102A, 102B, . . . , 102N, in CAN 100. For example, during an initial phase (e.g., immediately following an engine start and/or while a vehicle is warming up) and/or in an environment where it may be known that no ECU is compromised, feature set values may be determined and the classifier trained. Thus, training may occur during normal operation.

Inputs to the classifier circuitry 306, during the supervised training, include a legitimate ECU ID that corresponds to a received message and a signature, i.e., a feature set that includes values of one or more features, as described herein. To support supervised training and ECU authentication, each ECU ID (i.e., legitimate ECU ID) may be associated with one or more message IDs and stored in ID map store 307. In other words, message ID to ECU ID mapping is generally m to one, with m>=1. In the embodiments with a master ECU, a respective ECU ID for each ECU 102A, 102B, . . . , 102N included in CAN network 100 may be associated with one or more corresponding message IDs and stored to ID map store 307. In the other embodiments, with each receiving ECU configured to identify each transmitting ECU configured to transmit messages to that receiving ECU, each ECU may contain a respective ID map store 307. Each respective ID map store 307 is then configured to store one or more legitimate transmitting ECU identifiers associated with corresponding message identifiers. For example, the ID map information may be stored as a lookup table (LUT). Continuing with this example, signature circuitry 308 may be configured to determine an ECU ID (i.e., identify an ECU that may legitimately transmit a message) associated with a message ID included in a received message by using the message ID as an index into the respective map store 307. The ID map store 307 may be populated with a map information prior to operation of ECU 300.

Thus, in response to receiving a message, signature circuitry 308 and/or ACK threshold circuitry 312 may be configured to capture the message ID of the received message and to then identify the legitimate ECU associated with the captured message ID. ACK threshold circuitry 312 and feature set circuitry 310 may then be configured to determine a feature set, as described herein.

ACK threshold circuitry 312 may then be configured to capture a plurality of VCANH and/or VCANL values while the ECU is transmitting. Voltage measurement circuitry 314 is configured to receive an output from interface circuitry 316, e.g., from ADC circuitry, and to determine (i.e., measure) the corresponding voltage. ACK threshold circuitry 312 is configured to capture the plurality of VCANH and/or VCANL voltages during reception of 0 bits, i.e., VCANH0 and VCANL0. ACK threshold circuitry 312 is configured to store the captured voltage values in signature data store 309.

ACK threshold circuitry 312 may then be configured to determine one or more ACK threshold voltages based, at least in part, on the captured VCANH and/or VCANL voltages. The ACK threshold voltage values are related to CAN bus voltage values detected by a receiving ECU when a transmitting ECU is transmitting zero bits. For example, ACK threshold circuitry 312 may be configured to determine a high ACK threshold voltage value, VthH, related to VCANH and a low ACK threshold voltage value, VthL, related to VCANL. The zero bits are included in a transmitted message received by the receiving ECU.

ACK threshold circuitry 312 is configured to capture a number of VCANH and/or VCANL values during received zero bits. Constraining the captured bus line voltages to zero bits may be accomplished by constraining the VCANH and/or VCANL values to respective selected voltage ranges. The selected voltage ranges may be determined based, at least in part, on respective preset limits.

The measured voltages are stored to signature data store 309, if they fall within an applicable preset limit. The preset limits may differ for VCANH and VCANL. For VCANH, the measured voltages may be stored if they are above a CANH preset limit. The measured VCANL voltages may be stored if they are below a CANL preset limit. The preset limits may be determined before the measurements are made and may be related to nominal VCANH and nominal VCANL voltages associated with 0 bits.

For example, if the nominal voltages for a 0 bit are 3.5V for CANH and 1.5V for CANL, and the nominal voltage for a 1 bit is 2.5V (for both VCANH and VCANL), then the respective preset limits may correspond to each dominant voltage plus or minus, respectively about 37.5% of the difference (Vdiff) between them. As used herein, "about" means plus or minus one percent. For CANH, the limit is determined by subtracting the percentage from the nominal value for VCANH. For CANL, the limit is determined by adding the percentage to the nominal value for VCANL. To further clarify, in the above example, the preset limit for CANH is the nominal CANH voltage (3.5V) minus 37.5% of Vdiff. Vdiff is 3.5V−1.5V=2V, so 37.5% of Vdiff is 0.375*2V=0.75. Thus, the preset limit for VCANH is 3.5V−0.75V=2.75V, in this example. Similarly, the preset limit for CANL, in this example, is 1.5V+0.75V=2.25V. Thus, in this example, VCANH values are stored if they are above 2.75V while VCANL values are stored if they are below 2.25V.

The ACK threshold voltages VthH, VthL are related to characteristics of the received voltages VCANH and VCANL measured during reception of zero bits. For example, measurement of a plurality of CAN bus line voltages (high or low) may yield a distribution of voltage values (VCANH or VCANL). The distribution may correspond to a Gaussian probability distribution function. The ACK threshold voltages may then be utilized to filter out ACK bus line voltages, as described herein.

Thus, ACK threshold circuitry 312 may be configured to capture a corresponding message ID, in response to receiving a message, and to identify the legitimate transmitting ECU based, at least in part, on the message ID. ACK threshold circuitry 312 is configured to capture a number, N, CANH voltages greater than a CANH threshold voltage (i.e., preset limit) and CANL voltages less than a CANL threshold voltage (i.e., preset limit), during transmission/reception of a plurality of messages. For example, for a nominal VCANH of 3.5 V, the CANH threshold voltage may be 2.75 V and for a nominal VCANL of 1.5 V, the CANL threshold voltage may be 2.25 V.

The captured CANH and CANL voltages may be stored to signature data store 309. ACK threshold circuitry 312 is further configured to determine and store an initial most frequent CANH voltage value (VfreqH1) and an initial most frequent CANL voltage value (VfreqL1), for each N CANH and N CANL voltage values, respectively. VfreqH1 and VfreqL1 may be determined for a corresponding ECU that legitimately transmitted a selected message. In an embodiment, VfreqH1 and VfreqL1 may each correspond to a respective voltage value plus or minus a tolerance. In one example, the tolerance may be one percent (%). In another example, the tolerance may be 10%. Providing a voltage range for a respective voltage value is configured to avoid capturing a possibly infinite number of voltage values. The tolerances are configured to account for finite resolution and/or quantization associated with the ADC included in interface circuitry 316. A number, K, of messages may be received and a corresponding number (i.e., K) values of each of VfreqH1 and VfreqL1 may be determined and stored to signature data store 309 by ACK threshold circuitry 312.

ACK threshold circuitry 312 may then be configured to perform statistical analysis on the K VfreqH1 values and the K VfreqL1 values. In an embodiment, ACK threshold circuitry 312 may be configured to determine a count of each VfreqH1 value and a count of each VfreqL1 value. The counts of VfreqH1 values and the corresponding VfreqH1 values may then correspond to a probability distribution of VfreqH1 values. Similarly, the counts of VfreqL1 values and corresponding VfreqL1 values may correspond to a probability distribution of VfreqL1 values.

A mean and standard deviation of each probability distribution function may then be determined by, e.g., ACK threshold circuitry 312. A CANH ACK threshold voltage (VthH) and a CANL ACK threshold voltage (VthL) may then be determined based, at least in part, on the respective probability distribution functions. For example, VthH may correspond to a mean ($\mu_H$) plus a whole number multiple of a standard deviation ($\sigma_H$) of the probability distribution of VfreqH1 values and VthL may correspond to a mean ($\mu_L$) minus a whole number multiple of a standard deviation ($\sigma_L$) of the probability distribution of VfreqL1 values. The whole number multiple may be in the range of 1 to 5. For example, the whole number multiple may be equal to 3. The CANH ACK threshold voltage (VthH) and the CANL ACK threshold voltage (VthL) may then be stored to signature data store 309 and/or provided to feature set circuitry 310. In some embodiments, the ACK threshold voltages may be stored to signature data store 309 associated with the corresponding ECU identifier.

The ACK threshold voltages VthH, VthL may be used to reduce an impact on authentication operations of transmission of ACK bits by a plurality of ECUs. In other words, the ACK threshold voltages VthH, VthL are configured to bound VCANH and VCANL values that may be attributed to one transmitting ECU. Thus, a likelihood of including VCANH and VCANL values produced by a plurality of ECUs transmitting a zero bit during an ACK slot in a message, may be reduced. A likelihood of including the ACK voltages in a transmitting ECU signature may be reduced, without explicitly identifying the ACK bit in the message frame.

Feature set circuitry 310 may then be configured to determine one or more feature values based, at least in part, on the ACK threshold voltages. The feature values may then be stored to signature data store 309, associated with the corresponding ECU identifier. A plurality of feature sets may be stored to signature data store 309 for each ECU ID. The plurality of feature sets and associated ECU IDs may then be utilized to build the classifier, using machine learning techniques, as described herein.

Feature set circuitry 310 is configured to determine a set of feature values for a feature set. The feature set is configured to be used by classifier circuitry 306 during operation of controller area network 100 in order to identify a transmitting ECU that corresponds to a received message. The feature set may include one or more features related to CAN bus voltages, VCANH and VCANL, determined based, at least in part, on a plurality of zero bits included in a plurality of messages. The feature set may include one or more of the features listed in Table 1, below.

TABLE 1

| Feature number | Feature |
| --- | --- |
| F1 | VCANHmax |
| F2 | VfreqH2 |
| F3 | VthH |
| F4 | Moving average of F1 |
| F5 | Moving average of F2 |
| F6 | VCANLmin |
| F7 | VfreqL2 |
| F8 | VthL |
| F9 | Moving average of F6 |
| F10 | Moving average of F7 |

In Table 1, VCANHmax and VCANLmin correspond to a maximum VCANH voltage and a minimum VCANL voltage, respectively, captured by a receiving ECU during transmission of a message. The moving averages of features of F4, F5, F6 and F7 may be determined, over time, during operation of ECU 200 (and controller area network 100). The moving averages of features F4, F5, F6 and F7 are configured to account for measurement jitter and to, thus, provide smoothing to feature values.

Feature set circuitry 310 is configured to capture a number, M, of each CANH and CANL voltages that fall between respective preset limits for a received message. The preset limits are related to nominal bus voltages and include the ACK threshold voltages VthH, VthL. For example, for a nominal VCANH of 3.5V, a corresponding CANH threshold voltage may be 2.75V. Thus, in this example, VCANH voltages that are greater than 2.75 V and less than VthH may be captured and stored in signature data store 309. In another example, for nominal VCANL of 1.5V, a corresponding CANL threshold voltage may be 2.25V. Thus, in this example, CANL voltages that are less than 2.25 V and greater than VthL may be captured and stored in signature data store 309.

Feature set circuitry 310 is configured to determine and store an operating most frequent CANH voltage value (VfreqH2) for the M captured VCANH values. Feature set circuitry 310 is further configured to determine and store an operating most frequent CANL voltage value (VfreqL2) for the M captured VCANL values. It may be appreciated that the captured CANH and CANL voltages, utilized for determining VfreqH2 and VfreqL2, have both an upper and a lower bound. This differs from the determination of the initial most frequent CANH voltage value (VfreqH1) and the initial most frequent CANL voltage value (VfreqL1). VfreqH1 and VfreqL1 were each determined using only a single respective bound, as described herein. Constraining captured VCANH values to values less than VthH and constraining captured VCANL values to values greater than VthL may filter out VCANH and VCANL voltage values corresponding to ACK bits. Such filtering may enhance the specificity of a corresponding signature (i.e., feature values in a feature set) and thus authentication accuracy.

Feature set circuitry 310 is configured to identify (i.e., determine) and store a maximum CANH voltage value (VCANHmax) and a minimum CANL voltage value (VCANLmin) of the captured CANH and CANL voltage values. VCANHmax and VCANLmin are configured to fall between the respective preset limits for a received message, as described herein.

Thus, values of features VfreqH2, VfreqL2, VCANHmax, VCANLmin, VthH and VthL may be determined based, at least in part, on voltages VCANH and VCANL associated with zero bits in a received message. During an initial phase (e.g., immediately following an engine start and/or while a vehicle is warming up) and/or in an environment where it may be known that no ECU is compromised, feature set values may be determined. The feature set values may then be associated with a corresponding ECU identifier and stored to signature data store 309. The feature set values may be associated and stored by ECU 300, e.g., by a master ECU and/or by each ECU for the respective subset of messages to which a respective ECU is configured to respond. During operation, the feature set values may be provided to classifier circuitry 306 (that has been trained) for identification of the transmitting ECU.

Thus, feature set circuitry 310 may be configured to determine one or more values of one or more features included in the feature set described above in Table 1. The feature set values may then be associated with the corresponding ECU identifier and stored in signature data store 309. Feature set circuitry 310 is configured to utilize the ACK threshold values, VthH and VthL, determined by ACK threshold circuitry 312 to reduce and/or eliminate "noise" in the voltage measurements caused by a plurality of ECUs transmitting an ACK bit. The feature set and associated ECU identifier may then be utilized to train a classifier, e.g., classifier circuitry 306, as described herein.

Signature circuitry 308 may be configured to manage training classifier circuitry 306. Training may include, for example, providing a plurality of sets of feature set values and corresponding ECU identifiers to classifier circuitry 306 and adjusting classifier circuitry 306 parameters. Classifier circuitry 306 may include but is not limited to, a support vector machine (SVM), a random forest, a logistic regression, etc. Signature circuitry 308 may be configured to determine whether there is an adequate number of feature sets for constructing the classifier. If there is not an adequate number of feature sets, then feature set circuitry 310 may be configured to determine additional feature set values associated with additional received messages and corresponding ECU identifiers. If there is an adequate number of feature sets, then signature circuitry 308 may be configured to initiate and/or continue training classifier circuitry 306.

Thus, during an initial phase (e.g., immediately following an engine start and/or while a vehicle is warming up) and/or in an environment where it may be known that no ECU is compromised, one or more ECUs may be configured to capture a plurality of VCANH and/or VCANL voltages. The one or more ECUs may then be configured to determine ACK threshold voltages for a target ECU, to determine a set of feature values for the target ECU and to train classifier circuitry. The training is configured to relate a set of feature values to an ECU identifier.

Classifier circuitry 306 may then be configured to identify a transmitting ECU based, at least in part, on feature sets. The feature sets may be determined based, at least in part, on VCANH and/or VCANL voltages captured during transmission of a message. For example, classifier circuitry 306 may be configured to provide a reference ECU ID that corresponds to the identified transmitting ECU to signature circuitry 308. Signature circuitry 308 may then be configured to determine whether the identified ECU may legitimately transmit the received message. For example, signature circuitry 308 may be configured to determine whether the reference ECU ID matches the legitimate ECU ID associated with the received message identifier in ID map store 307. For example, in response to a transmitted message received by at least the master ECU, the master ECU may identify a legitimate ECU ID based, at least in part, on the message ID included in the received message and based, at least in part, on the ID map store 307. A corresponding feature set determined during the reception of the transmitted message may then be provided to the classifier circuitry 306. The classifier circuitry may be configured to output a corresponding reference ECU ID. If the legitimate ECU ID and reference ECU ID do not match, then the transmitting ECU may be compromised.

Thus, feature set circuitry 310 is configured to determine one or more feature values based, at least in part, on received VCANH0 and VCANL0 (i.e., zero bit voltages), as described herein. Feature set circuitry 310 may be further configured to adjust ACK threshold voltages based, at least in part, on characteristics of VCANH0 and VCANL0 measured during zero bits, as described herein.

In some embodiments, feature set circuitry 310 may be further configured to determine respective probabilities, PoutH and PoutL, that recently captured CANH and CANL voltage values are outside their respective ACK threshold voltages, i.e., VCANH>VthH and VCANL<VthL. As used herein, "recently captured" corresponds to captured within a time period and/or captured within a defined number of messages. For example, a duration of the time period may be in the range of one second to 10 seconds. In another example, the number of messages may be in the range of 10 messages to 20 messages. In an embodiment, PoutH may be determined as a number of recently captured CANH voltage values that are greater than VthH divided by a number of recently captured CANH voltage values. In another embodiment, PoutL may be determined as a number of recently captured CANL voltage values that are less than VthL divided by a number of recently captured CANL voltage values.

The probabilities PoutH and PoutL may then be utilized to adjust the ACK threshold voltages, VthH and VthL, respectively, i.e., to facilitate adaptive learning. Such adjusting may accommodate drift, for example, in the output voltages of the transceivers of transmitting ECUs over time. In an embodiment, a function fpen ("penalty function") of each of the probabilities PoutH and PoutL may be utilized to adjust the ACK threshold voltages. For example, fpen may correspond to multiplying a function of each probability by a factor (i.e., a weight), prior to adjusting the ACK threshold voltages. The factor may be in the range of 0.5 to 1. In another example, fpen may correspond to 1.2.

For example, fpen may utilize a respective ratio of each probability PoutH and PoutL to an expected probability Pexp. This Pexp may be determined based on, for example, the size (in bits) of an ACK transmission compared to the rest of a transmitted message. Feature set circuitry 310 is configured to determine a ratio of a number of ACK bit to a number of normal (i.e., non-ACK) bits over an interval, e.g., time interval, sequence of bits, etc. For example, for a message frame with 128 bits, and assuming half of the bits are 0 bits and half of the bits are 1 bits (i.e., one bits and zero bits equally likely), the likelihood that a zero bit in the received message frame is an ACK bit (ACK bit=0) is 1/(128/2)=1/64 or about 1.56%. Thus, in this example, the feature value is rounded up to a whole number, i.e., 2%. In such a scenario, if more than 2% of the measured CANH voltages were above VthH (i.e., PoutH/Pexp>1), this would suggest that the VthH is too low. This may cause "legitimate" CANH voltages that would be useful for signature analysis to be mislabeled as ACK signals and accordingly discarded. The ACK threshold voltages, VthH, VthL, may then be adjusted by adding or subtracting, respectively, a product of the factor (e.g., a value between 0.5 and 1.0) and the ratio (e.g., PoutH/Pexp, PoutL/Pexp). Thus, the penalty function fpen advantageously allows for adaptively learning and adjusting the ACK threshold voltage based, at least in part, on an expected probability and based, at least in part, on a measured, i.e., recently determined, probability, increasing accuracy of authentication operations. Feature set circuitry 310 may be configured to adjust the high ACK threshold voltage VthH by adding a result of fpen(PoutH) to VthH and/or may be configured to adjust the low ACK threshold voltage VthL by subtracting a result of fpen (PoutL) from VthL.

Thus, values of features VfreqH2, VfreqL2, VCANHmax, VCANLmin, VthH (initial or adjusted), VthL (initial or adjusted) may be determined based, at least in part, on voltages, VCANH and VCANL, associated with zero bits in a received message. The corresponding feature set may then be stored, provided to classifier circuitry 306 and/or retrieved by classifier circuitry 306. Classifier circuitry 306 may then be configured to provide a reference ECU identifier based, at least in part, on the feature values determined by feature set circuitry 310.

Signature circuitry 308 may be further configured to determine whether the transmitting ECU identifier provided by classifier circuitry 306 corresponds to an ECU that may legitimately transmit the received message. For example, signature circuitry 310 may be configured to determine whether the legitimate ECU ID associated with the captured message identifier in ID map store 307 corresponds to (i.e., matches) the transmitting ECU identifier (i.e., reference ECU ID) provided by classifier circuitry 306. If the legitimate ECU ID does not match the reference ECU identifier, then signature circuitry 308 may be configured to notify a possible fault.

Thus, classifier circuitry may be trained using supervised learning techniques. In other words, a plurality of feature set and corresponding legitimate ECU ID pairs may be utilized to train the classifier circuitry. In operation, a set of feature values, i.e., a feature set, may be provided to classifier circuitry and the classifier circuitry may be configured to determine a reference ECU ID. A legitimate ECU ID may be determined based, at least in part, on a captured message ID. The reference ECU ID and legitimate ECU ID may then be compared to determine whether or not received message was legitimately transmitted by the transmitting ECU.

Thus, a transmitting ECU may be identified based, at least in part, on voltage values associated with a received message, a received message identifier and a corresponding set of feature values. The set of feature values may be determined based, at least in part, on the measured voltage values. Whether the transmitting ECU may legitimately transmit the received message may then be determined, e.g., by comparing a reference ECU ID from a classifier to a legitimate ECU ID associated with the received message ID in an ID map store. A result of the determination may then indicate whether or not the transmitting ECU has been compromised.

Figure 4:
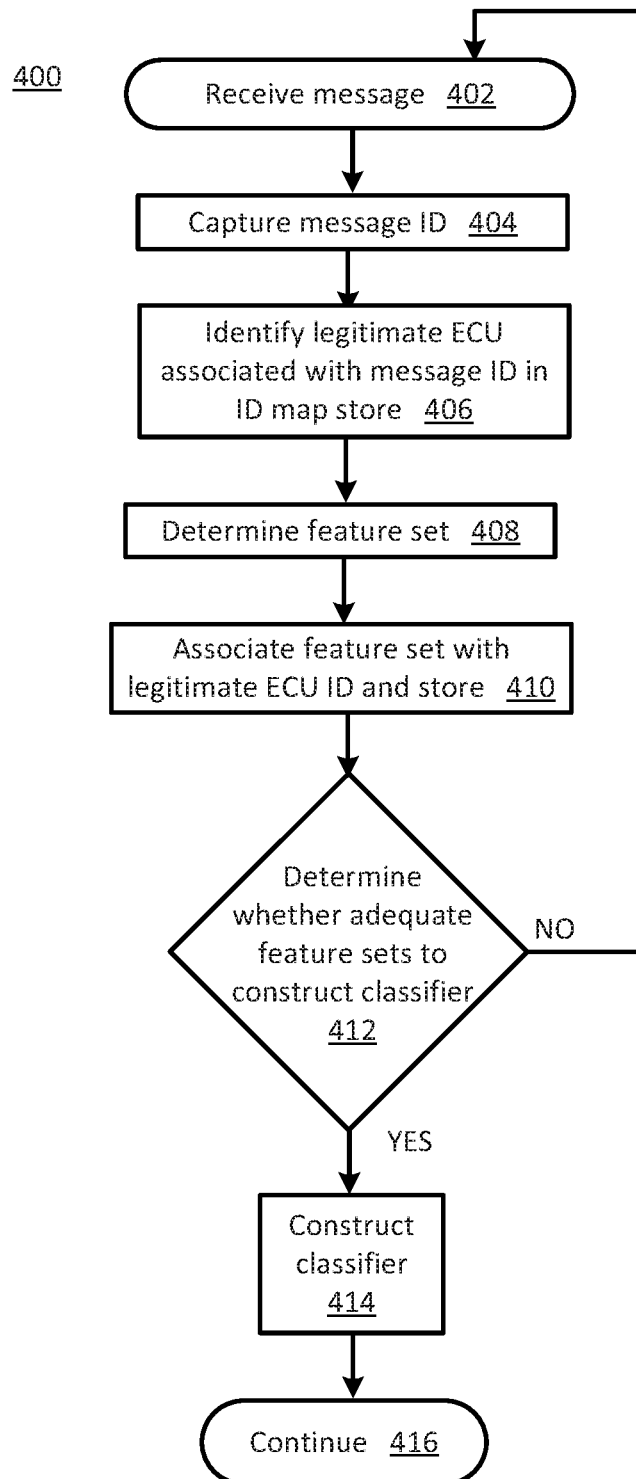
FIG. 4 is a flowchart of operations illustrating classifier construction in accordance with at least one embodiment herein.

FIG. 4 is a flowchart 400 of operations illustrating classifier construction in accordance with at least one embodiment herein. In particular, the flowchart 400 illustrates constructing a classifier based, at least in part, on sets of feature values and corresponding transmitting ECU identifiers (i.e., legitimate ECU identifiers). The operations may be performed, for example, by signature circuitry 308, feature set circuitry 310, ACK threshold circuitry 312 and/or voltage measurement circuitry 314 of FIG. 3.

Operations of flowchart 400 may begin with receiving a message at operation 402. A message identifier may be captured at operation 404. A legitimate ECU associated with the message identifier in an ID map store may be identified (i.e., determined) at operation 406. A feature set may be determined at operation 408. For example, operation 408 may include one or more operations of flowchart 500 and/or flowchart 600, as will be described in more detail below The feature set may be associated with a stored ECU identifier (i.e., a legitimate ECU ID) and stored at operation 410.

Whether there are adequate feature sets to construct a classifier may be determined at operation 412. If there are not adequate feature sets to construct the classifier, program flow may return to operation 402. If there are adequate feature sets to construct the classifier, then the classifier may be constructed at operation 414. Program flow may then continue at operation 416.

Figure 5:
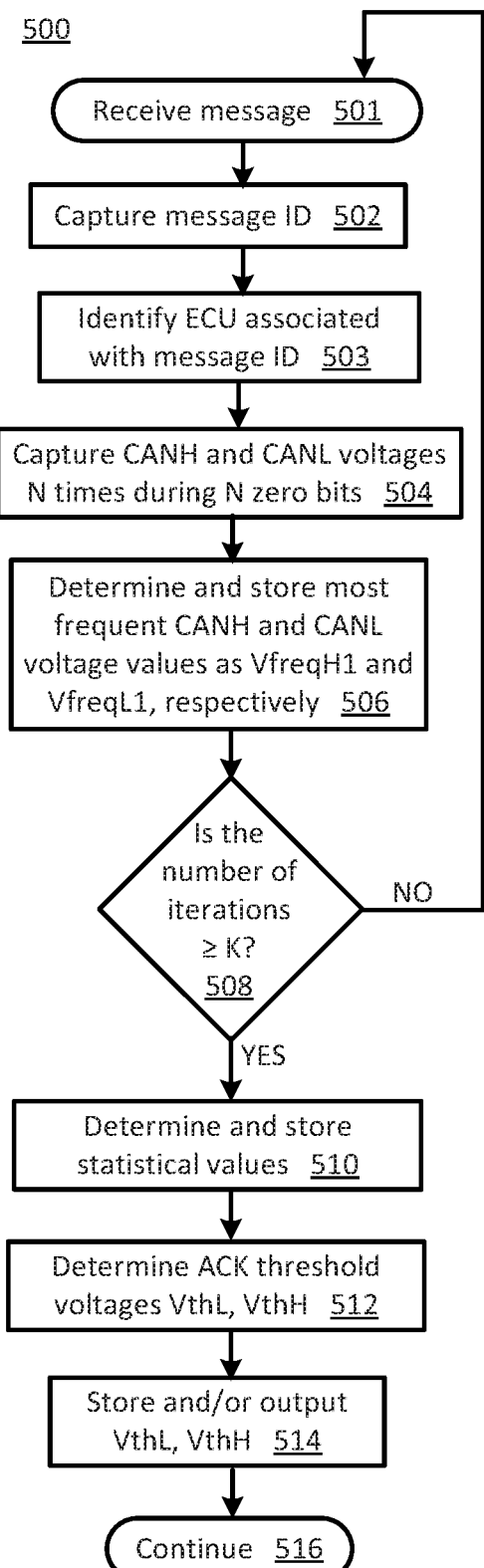
FIG. 5 is a flowchart of operations illustrating determination of acknowledge (ACK) threshold voltages in accordance with at least one embodiment herein.

FIG. 5 is a flowchart 500 of operations illustrating determination of acknowledge (ACK) threshold voltages in accordance with at least one embodiment herein. In particular, the flowchart 500 illustrates determining ACK threshold voltages based, at least in part, on statistics associated with zero bits included in a received message. The operations may be performed, for example, by ACK threshold circuitry 312 of FIG. 3.

Operations of flowchart 500 may begin with receiving a message at operation 501. A message ID may be captured at operation 502. An ECU, i.e., a legitimate ECU, associated with the message ID may be identified at operation 503. A number, N, of CANH and CANL voltages may be captured during N zero bits at operation 504. For example, VCANH greater than a high preset limit and VCANL less than a low preset limit may be captured. An initial most frequent CANH high bus line voltage value and an initial most frequent CANL low bus line voltage value may be determined and stored as VfreqH1 and VfreqL1, respectively, at operation 506. Whether the number of iterations is greater than or equal to a number, K, may be determined at operation 508.

If the number of iterations is not greater than or equal to K, then program flow may return to operation 501. If the number of iterations is greater than or equal to K, then one or more statistical values may be determined and stored at operation 510. The statistical values may include, for example, a mean and a standard deviation of each distribution of VfreqH1 and VfreqL1. ACK threshold voltages VthL and VthH may be determined at operation 512. The ACK threshold voltages VthL and VthH may be stored and/or output at operation 514. Program flow may then continue at operation 516.

Figure 6:
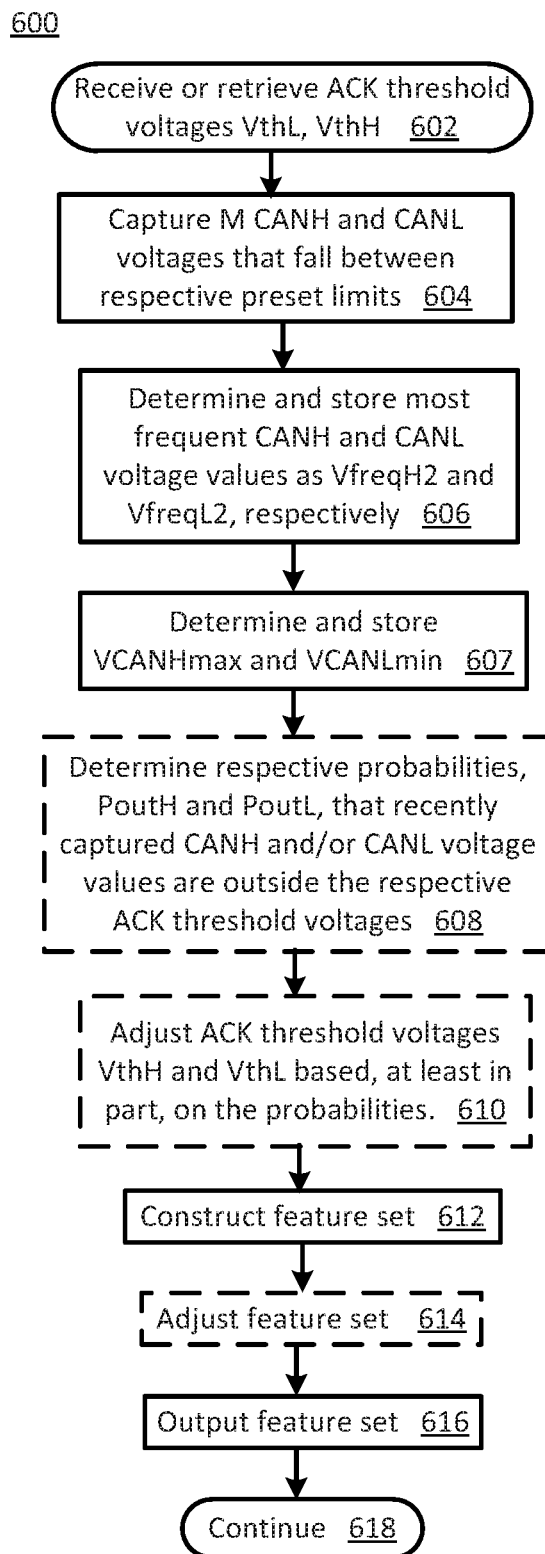
FIG. 6 is a flowchart of operations illustrating determination of feature values of a feature set in accordance with at least one embodiment herein.

FIG. 6 is a flowchart 600 of operations illustrating determination of feature values of a feature set in accordance with at least one embodiment herein. In particular, the flowchart 600 illustrates generating feature values of a feature set based, at least in part, on CANH and CANL voltages (e.g., VCANH and VCANL) and based, at least in part, on ACK threshold voltages VthL and VthH. The operations of flowchart 600 may be performed, for example, by feature set circuitry 310 of FIG. 3.

Operations of flowchart 600 may begin with receiving or retrieving ACK threshold voltages VthH and VthL at operation 602. A number, M, of CANH and CANL voltages that fall between respective preset limits may be captured at operation 604. For example, VCANH greater than a high preset limit and less than VthH may be captured and/or VCANL less than a low preset limit and greater than VthL may be captured. Most frequent CANH and CANL voltage values may be determined and stored as VfreqH2 and VfreqL2, respectively, at operation 606. A maximum VCANH voltage, VCANHmax, and a minimum VCANL voltage, VCANLmin, may be determined at operation 607. In some embodiments, respective probabilities, PoutH and PoutL, that recently captured CANH and/or CANL voltage values are outside the respective ACK threshold voltages may be determined at operation 608. The ACK threshold voltages VthH and VthL may be adjusted based, at least in part, on the probabilities at operation 610. A feature set may be constructed at operation 612. In some embodiments, the feature set may be adjusted at operation 614. For example, operation 614 may include constructing and adding new features to the feature set. For example, moving average(s) of one or more features may be generated and added to the feature set. The feature set may be output at operation 616. Program flow may then continue at operation 618.

Figure 7:
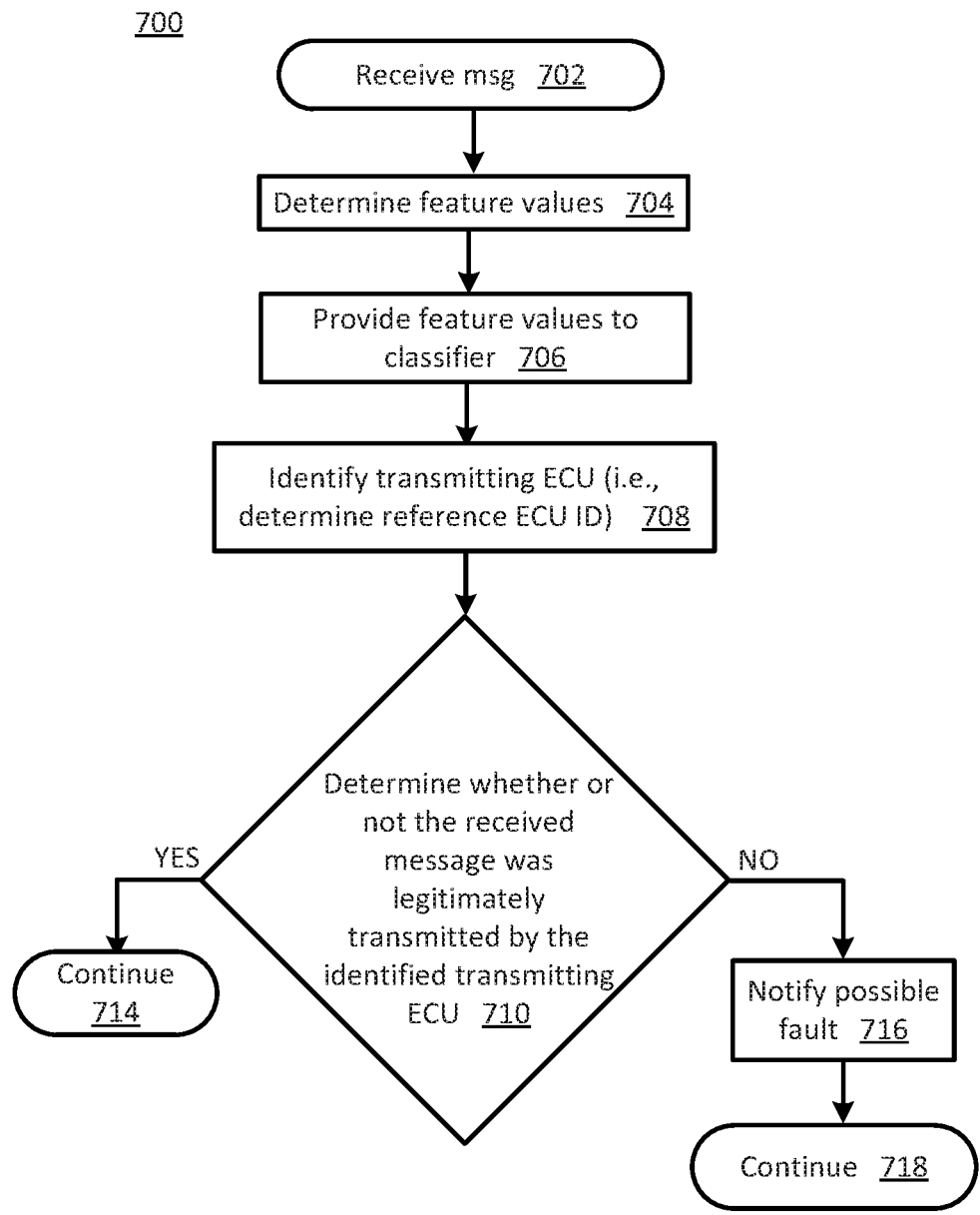
FIG. 7 is a flowchart of operations illustrating authenticating a received message, in accordance with at least one embodiment herein.

FIG. 7 is a flowchart 700 of operations illustrating authenticating a received message, in accordance with at least one embodiment herein. In particular, the flowchart 700 illustrates identifying a transmitting ECU based, at least in part, on a signature of a received message and determining whether the identified ECU may legitimately transmit the received message. The operations of flowchart 700 may be performed, for example, by signature circuitry 308, voltage measurement circuitry 314, feature set circuitry 310 and/or classifier circuitry 306 of FIG. 3.

Operations of flowchart 700 may begin with receiving a message at operation 702. Feature values may be determined at operation 704. For example, operation 704 may include operations 602, 604, 606, 607, 612 and 616 of FIG. 6. The feature values may be provided to a classifier, e.g., classifier circuitry 306, at operation 706. The transmitting ECU may be identified at operation 708. For example, a reference ECU identifier corresponding to the transmitting ECU may be determined. Whether or not the received message was legitimately transmitted by the identified transmitting ECU may be determined at operation 710. For example, determining whether or not the received message was legitimately transmitted by the identified transmitting ECU may include determining whether the reference ECU identifier matches a legitimate ECU identifier associated with a received message ID. The legitimate ECU identifier may be determined based, at least in part, on a message identifier included in the received message.

If the received message was legitimately transmitted by the identified transmitting ECU (i.e., the message is authenticated), then program flow may continue at operation 714. If the received message was not legitimately transmitted by the identified transmitting ECU, then a possible fault may be notified at operation 716. Program flow may then continue at operation 718.

While the flowcharts of FIGS. 4 through 7 illustrate operations according to various embodiments, it is to be understood that not all of the operations depicted in FIGS. 4 through 7 are necessary for other embodiments. In addition, it is fully contemplated herein that in other embodiments of the present disclosure, the operations depicted in FIGS. 4, 5, 6, and/or 7 and/or other operations described herein may be combined in a manner not specifically shown in any of the drawings, and such embodiments may include less or more operations than are illustrated in FIGS. 4 through 7. Thus, claims directed to features and/or operations that are not exactly shown in one drawing are deemed within the scope and content of the present disclosure.

In some embodiments, bus 106 and/or ECU 102A, 102B ..., 102N and/or 300 (e.g., transceiver circuitry 318) may comply and/or be compatible one or more bus protocols. In one example, bus 106 and/or ECU 102A, 102B ..., 102N and/or 300 (e.g., transceiver circuitry 318) may comply and/or be compatible with one or more CAN bus protocols and/or standards including an International Organization for Standardization (ISO) 11898 family of standards titled Road Vehicles—Controller Area Network (CAN) including, but not limited to, ISO 11898-1:2015, titled Road vehicles—Controller area network (CAN)—Part 1: Data link layer and physical signaling, published Dec. 15, 2015, and/or earlier and/or later and/or related versions of this standard, e.g., one or more of ISO 11898-2:2016, ISO 11898-3:2006, ISO 11898-4:2004, ISO 11898-5:2007, ISO 11898-6:2013. In another example, bus 106 and/or ECU 102A, 102B ..., 102N and/or 300 (e.g., transceiver circuitry 318) may comply and/or be compatible with a Society of Automotive Engineers (SAE) International® surface vehicle data communication standard J1850_201510, titled Class B Data Communications Network Interface, published Oct. 14, 2015, and/or earlier and/or later and/or related versions of the standard.

The memory circuitry 304 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable storage devices.

Embodiments of the operations described herein may be implemented in a system that includes at least one tangible computer-readable storage device having stored thereon, individually or in combination, instructions that when executed by one or more processors perform the operations. The one or more processors may include, for example, a processing unit and/or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage device suitable for storing electronic instructions.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry 302 executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry 302 may be embodied as a stand-alone integrated circuit or may be incorporated as one of several components on an integrated circuit. In some embodiments, the various components and circuitry of the ECU 300 or other systems may be combined in a system-on-a-chip (SoC) architecture.

In some embodiments, a hardware description language (HDL) may be used to specify circuit and/or logic implementation(s) for the various circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to a security system for electronic equipment, as discussed below.

Example 1

According to this example, there is provided an electronic control unit (ECU) for a vehicle. The ECU includes transceiver circuitry, voltage measurement circuitry and feature set circuitry. The transceiver circuitry is to at least one of send and/or receive a message. The voltage measurement circuitry is to determine at least one of a high bus line voltage (VCANH) value and/or a low bus line voltage (VCANL) value, for each zero bit of at least one zero bit of a received message. The received the message includes a plurality of bits. The feature set circuitry is to determine a value of at least one feature of a feature set based, at least in part, on at least one of a high acknowledge (ACK) threshold voltage (VthH) and/or a low ACK threshold voltage (VthL). The feature set includes at least one of an operating most frequently measured VCANH value (VfreqH2) of a number of VCANH values and/or an operating most frequently measured VCANL value (VfreqL2) of a number of VCANL values.

Example 2

This example includes the elements of example 1, further including ACK threshold circuitry to determine at least one of the VthH and/or the VthL, the VthH determined based, at least in part, on an initial most frequently measured VCANH value (VfreqH1) and the VthL determined based, at least in part, on an initial most frequently measured VCANL value (VfreqL1).

Example 3

This example includes the elements of example 1, further including classifier circuitry to identify a transmitting ECU that transmitted the received message based, at least in part, on the set of feature values.

Example 4

This example includes the elements of example 3, further including signature circuitry to determine whether or not the received message was legitimately transmitted by the identified transmitting ECU.

Example 5

This example includes the elements according to any one of examples 1 to 3, wherein the feature set includes VthH and/or VthL, and VthH corresponds to an initial value of the high ACK threshold voltage or an adjusted value of the high ACK threshold voltage and VthL corresponds to an initial value of the low ACK threshold voltage or an adjusted value of the low ACK threshold voltage.

Example 6

This example includes the elements according to any one of examples 1 to 3, wherein the feature set circuitry is further to determine at least one of a first probability (PoutH) that a recently captured VCANH value is greater than VthH and/or a second probability (PoutL) that a recently captured VCANL value is less than VthL.

Example 7

This example includes the elements according to any one of examples 1 to 3, wherein the feature set further includes one or more of a maximum measured VCANH value (VCANHmax) and/or a minimum measured VCANL value (VCANLmin).

Example 8

This example includes the elements according to any one of examples 1 to 3, wherein the feature set further includes a moving average of VfreqH2 and a moving average of VthH and/or a moving average of VfreqL2 and a moving average of VthL.

Example 9

This example includes the elements of example 6, wherein the feature set circuitry is further to at least one of adjust VthH based, at least in part, on PoutH and/or adjust VthL based, at least in part, on PoutL.

Example 10

This example includes the elements according to any one of examples 1 to 3, further including an identifier map store to store a plurality of legitimate ECU identifiers (IDs) and a plurality of message IDs, each legitimate ECU ID associated with a unique subset of the plurality of message IDs.

Example 11

According to this example, there is provided a security method. The method includes at least one of sending and/or receiving, by transceiver circuitry of an electronic control unit (ECU) for a vehicle, a message. The method further includes determining, by voltage measurement circuitry of the ECU, at least one of a high bus line voltage (VCANH) value and/or a low bus line voltage (VCANL) value, for each zero bit of at least one zero bit of a received message. The received the message includes a plurality of bits. The method further includes determining, by feature set circuitry of the ECU, a value of at least one feature of a feature set based, at least in part, on at least one of a high acknowledge (ACK) threshold voltage (VthH) and/or a low ACK threshold voltage (VthL). The feature set includes at least one of an operating most frequently measured high bus line voltage value (VfreqH2) of a number of VCANH values and/or an operating most frequently measured VCANL value (VfreqL2) of a number of VCANL values.

Example 12

This example includes the elements of example 11, further including determining, by ACK threshold circuitry of the ECU, at least one of the VthH and/or the VthL, the VthH determined based, at least in part, on an initial most frequently measured VCANH value (VfreqH1) and the VthL determined based, at least in part, on an initial most frequently measured VCANL value (VfreqL1).

Example 13

This example includes the elements of example 11, further including identifying, by classifier circuitry of the ECU, a transmitting ECU that transmitted the received message based, at least in part, on the set of feature values.

Example 14

This example includes the elements of example 13, further including determining, by signature circuitry of the ECU, whether or not the received message was legitimately transmitted by the identified transmitting ECU.

Example 15

This example includes the elements of example 11, wherein the feature set includes VthH and/or VthL, and VthH corresponds to an initial value of the high ACK threshold voltage or an adjusted value of the high ACK threshold voltage and VthL corresponds to an initial value of the low ACK threshold voltage or an adjusted value of the low ACK threshold voltage.

Example 16

This example includes the elements of example 11, further including determining, by the feature set circuitry, at least one of a first probability (PoutH) that a recently captured VCANH value is greater than VthH and/or a second probability (PoutL) that a recently captured VCANL value is less than VthL.

Example 17

This example includes the elements of example 11, wherein the feature set further includes one or more of a maximum measured VCANH value (VCANHmax) and/or a minimum measured VCANL value (VCANLmin).

Example 18

This example includes the elements of example 11, wherein the feature set further includes a moving average of VfreqH2 and a moving average of VthH and/or a moving average of VfreqL2 and a moving average of VthL.

Example 19

This example includes the elements of example 16, further including adjusting, by the feature set circuitry, at least one of VthH based, at least in part, on PoutH and/or VthL based, at least in part, on PoutL.

Example 20

This example includes the elements of example 11, further including storing, by an identifier map store, a plurality of legitimate ECU identifiers (IDs) and a plurality of message IDs, each legitimate ECU ID associated with a unique subset of the plurality of message IDs.

Example 21

This example includes the elements of example 11, further including coupling, by a communication bus, a plurality of ECUs.

Example 22

This example includes the elements of example 21, wherein the communication bus complies and/or is compatible with a controller area network (CAN) bus protocol.

Example 23

According to this example, there is provided a vehicle system. The vehicle system includes a plurality of electronic control units (ECUs); and a communication bus to couple the plurality of ECUs. Each ECU includes transceiver circuitry to at least one of send and/or receive a message. At least one ECU includes voltage measurement circuitry and feature set circuitry. The voltage measurement circuitry is to determine at least one of a high bus line voltage (VCANH) value and/or a low bus line voltage (VCANL) value, for each zero bit of at least one zero bit of a received message. The received the message including a plurality of bits. The feature set circuitry is to determine a value of at least one feature of a feature set based, at least in part, on at least one of a high acknowledge (ACK) threshold voltage (VthH) and/or a low ACK threshold voltage (VthL). The feature set includes at least one of an operating most frequently measured VCANH value (VfreqH2) of a number of VCANH values and/or an operating most frequently measured VCANL value (VfreqL2) of a number of VCANL values.

Example 24

This example includes the elements of example 23, wherein the at least one ECU further includes ACK threshold circuitry to determine at least one of the VthH and/or the VthL, the VthH determined based, at least in part, on an initial most frequently measured VCANH value (VfreqH1) and the VthL determined based, at least in part, on an initial most frequently measured VCANL value (VfreqL1).

Example 25

This example includes the elements of example 23, wherein the at least one ECU further includes classifier circuitry to identify a transmitting ECU that transmitted the received message based, at least in part, on the set of feature values.

Example 26

This example includes the elements of example 25, wherein the at least one ECU further includes signature circuitry to determine whether or not the received message was legitimately transmitted by the identified transmitting ECU.

Example 27

This example includes the elements according to any one of examples 23 to 25, wherein the feature set includes VthH and/or VthL, and VthH corresponds to an initial value of the high ACK threshold voltage or an adjusted value of the high ACK threshold voltage and VthL corresponds to an initial value of the low ACK threshold voltage or an adjusted value of the low ACK threshold voltage.

Example 28

This example includes the elements according to any one of examples 23 to 25, wherein the feature set circuitry is further to determine at least one of a first probability (PoutH) that a recently captured VCANH value is greater than VthH and/or a second probability (PoutL) that a recently captured VCANL value is less than VthL.

Example 29

This example includes the elements according to any one of examples 23 to 25, wherein the feature set further includes one or more of a maximum measured VCANH value (VCANHmax) and/or a minimum measured VCANL value (VCANLmin).

Example 30

This example includes the elements according to any one of examples 23 to 25, wherein the feature set further includes a moving average of VfreqH2 and a moving average of VthH and/or a moving average of VfreqL2 and a moving average of VthL.

Example 31

This example includes the elements of example 28, wherein the feature set circuitry is further to at least one of adjust VthH based, at least in part, on PoutH and/or adjust VthL based, at least in part, on PoutL.

Example 32

This example includes the elements according to any one of examples 23 to 25, wherein the at least one ECU further includes an identifier map store to store a plurality of legitimate ECU identifiers (IDs) and a plurality of message IDs, each legitimate ECU ID associated with a unique subset of the plurality of message IDs.

Example 33

This example includes the elements according to any one of examples 23 to 25, wherein the communication bus complies and/or is compatible with a controller area network (CAN) bus protocol.

Example 34

According to this example, there is provided a computer readable storage device. The computer readable storage device has stored thereon instructions that when executed by one or more processors result in the following operations including: at least one of sending and/or receiving a message; determining at least one of a high bus line voltage (VCANH) value and/or a low bus line voltage (VCANL) value, for each zero bit of at least one zero bit of a received message, the received the message including a plurality of bits; and determining a value of at least one feature of a feature set based, at least in part, on at least one of a high acknowledge (ACK) threshold voltage (VthH) and/or a low ACK threshold voltage (VthL), the feature set including at least one of an operating most frequently measured high bus line voltage value (VfreqH2) of a number of VCANH values and/or an operating most frequently measured VCANL value (VfreqL2) of a number of VCANL values.

Example 35

This example includes the elements of example 34, wherein the instructions that when executed by one or more processors results in the following additional operations including determining at least one of the VthH and/or the VthL, the VthH determined based, at least in part, on an initial most frequently measured VCANH value (VfreqH1) and the VthL determined based, at least in part, on an initial most frequently measured VCANL value (VfreqL1).

Example 36

This example includes the elements of example 34, wherein the instructions that when executed by one or more processors results in the following additional operations including identifying a transmitting ECU that transmitted the received message based, at least in part, on the set of feature values.

Example 37

This example includes the elements of example 36, wherein the instructions that when executed by one or more processors results in the following additional operations including determining whether or not the received message was legitimately transmitted by the identified transmitting ECU.

Example 38

This example includes the elements according to any one of examples 34 to 36, wherein the feature set includes VthH and/or VthL, and VthH corresponds to an initial value of the high ACK threshold voltage or an adjusted value of the high ACK threshold voltage and VthL corresponds to an initial value of the low ACK threshold voltage or an adjusted value of the low ACK threshold voltage.

Example 39

This example includes the elements according to any one of examples 34 to 36, wherein the instructions that when executed by one or more processors results in the following additional operations including determining, by the feature set circuitry, at least one of a first probability (PoutH) that a recently captured VCANH value is greater than VthH and/or a second probability (PoutL) that a recently captured VCANL value is less than VthL.

Example 40

This example includes the elements according to any one of examples 34 to 36, wherein the feature set further includes one or more of a maximum measured VCANH value (VCANHmax) and/or a minimum measured VCANL value (VCANLmin).

Example 41

This example includes the elements according to any one of examples 34 to 36, wherein the feature set further includes a moving average of VfreqH2 and a moving average of VthH and/or a moving average of VfreqL2 and a moving average of VthL.

Example 42

This example includes the elements according to any one of examples 34 to 36, wherein the instructions that when executed by one or more processors results in the following additional operations including adjusting at least one of VthH based, at least in part, on PoutH and/or VthL based, at least in part, on PoutL.

Example 43

This example includes the elements according to any one of examples 34 to 36, wherein the instructions that when executed by one or more processors results in the following additional operations including storing a plurality of legitimate ECU identifiers (IDs) and a plurality of message IDs, each legitimate ECU ID associated with a unique subset of the plurality of message IDs.

Example 44

According to this example, there is provided a security device. The device includes at least one of means for sending and/or means for receiving, by transceiver circuitry of an electronic control unit (ECU) for a vehicle, a message. The device further means for determining, by voltage measurement circuitry of the ECU, at least one of a high bus line voltage (VCANH) value and/or a low bus line voltage (VCANL) value, for each zero bit of at least one zero bit of a received message, the received the message including a plurality of bits. The device further includes means for determining, feature set circuitry of the ECU, a value of at least one feature of a feature set based, at least in part, on at least one of a high acknowledge (ACK) threshold voltage (VthH) and/or a low ACK threshold voltage (VthL), the feature set including at least one of an operating most frequently measured high bus line voltage value (VfreqH2) of a number of VCANH values and/or an operating most frequently measured VCANL value (VfreqL2) of a number of VCANL values.

Example 45

This example includes the elements of example 44, further including means for determining, by ACK threshold circuitry of the ECU, at least one of the VthH and/or the VthL, the VthH determined based, at least in part, on an initial most frequently measured VCANH value (VfreqH1) and the VthL determined based, at least in part, on an initial most frequently measured VCANL value (VfreqL1).

Example 46

This example includes the elements of example 44, further including means for identifying, by classifier circuitry of the ECU, a transmitting ECU that transmitted the received message based, at least in part, on the set of feature values.

Example 47

This example includes the elements of example 46, further including means for determining, by signature circuitry of the ECU, whether or not the received message was legitimately transmitted by the identified transmitting ECU.

Example 48

This example includes the elements according to any one of examples 44 to 46, wherein the feature set includes VthH and/or VthL, and VthH corresponds to an initial value of the high ACK threshold voltage or an adjusted value of the high ACK threshold voltage and VthL corresponds to an initial value of the low ACK threshold voltage or an adjusted value of the low ACK threshold voltage.

Example 49

This example includes the elements according to any one of examples 44 to 46, further including means for determining, by the feature set circuitry, at least one of a first probability (PoutH) that a recently captured VCANH value is greater than VthH and/or a second probability (PoutL) that a recently captured VCANL value is less than VthL.

Example 50

This example includes the elements according to any one of examples 44 to 46, wherein the feature set further includes one or more of a maximum measured VCANH value (VCANHmax) and/or a minimum measured VCANL value (VCANLmin).

Example 51

This example includes the elements according to any one of examples 44 to 46, wherein the feature set further includes a moving average of VfreqH2 and a moving average of VthH and/or a moving average of VfreqL2 and a moving average of VthL.

Example 52

This example includes the elements of example 49, further including means for adjusting, by the feature set circuitry, at least one of VthH based, at least in part, on PoutH and/or VthL based, at least in part, on PoutL.

Example 53

This example includes the elements according to any one of examples 44 to 46, further including means for storing, by an identifier map store, a plurality of legitimate ECU identifiers (IDs) and a plurality of message IDs, each legitimate ECU ID associated with a unique subset of the plurality of message IDs.

Example 54

This example includes the elements according to any one of examples 44 to 46, further including means for coupling, by a communication bus, a plurality of ECUs.

Example 55

This example includes the elements of example 54, wherein the communication bus complies and/or is compatible with a controller area network (CAN) bus protocol.

Example 56

According to this example, there is provided a security system. The system includes at least one device arranged to perform the method of any one of examples 11 to 22.

Example 57

According to this example, there is provided a security device. The device includes means to perform the method of any one of examples 11 to 22.

Example 58

According to this example, there is provided a computer readable storage device. The device has stored thereon instructions that when executed by one or more processors result in the following operations including: the method according to any one of examples 11 to 22.

What is claimed is:

1. An electronic control unit (ECU) for a vehicle, the ECU comprising:
   transceiver circuitry to at least one of send and/or receive a message;
   voltage measurement circuitry to determine a high bus line voltage (VCANH) value and/or a low bus line voltage (VCANL) value for each zero bit of a received message;
   acknowledge (ACK) circuitry to determine, based on a plurality of VCANH and/or VCANL values corresponding to a plurality of received messages, an initial most frequently measured VCANH value (VfreqH1) and/or an initial most frequently measured VCANL value (VfreqL1), the ACK circuitry to further determine a high ACK threshold voltage (VthH) and/or a low ACK threshold voltage (VthL) based on the VfreqH1 and/or the VfreqL1; and
   feature set circuitry to determine a value of at least one feature of a feature set, the feature set comprising at least one of an operating most frequently measured VCANH value (VfreqH2) of a number of VCANH values and/or an operating most frequently measured VCANL value (VfreqL2) of a number of VCANL values;
   wherein the VfreqH2 is determined based on VCANH values less than VthH; and
   wherein the VfreqL2 is determined based on VCANL values greater than VthL.

2. The ECU of claim 1, further comprising classifier circuitry to identify a transmitting ECU that transmitted the received message based, at least in part, on the set of feature values.

3. The ECU of claim 2, further comprising signature circuitry to determine whether or not the received message was legitimately transmitted by the identified transmitting ECU.

4. The ECU of claim 1, wherein the feature set comprises VthH and/or VthL, and VthH corresponds to an initial value of the high ACK threshold voltage or an adjusted value of the high ACK threshold voltage and VthL corresponds to an initial value of the low ACK threshold voltage or an adjusted value of the low ACK threshold voltage.

5. The ECU of claim 1, wherein the feature set circuitry is further to determine at least one of a first probability (PoutH) that a recently captured VCANH value is greater than VthH and/or a second probability (PoutL) that a recently captured VCANL value is less than VthL.

6. The ECU of claim 1, wherein the feature set further comprises a moving average of VfreqH2 and a moving average of VthH and/or a moving average of VfreqL2 and a moving average of VthL.

7. A method comprising:
   at least one of sending and/or receiving, by transceiver circuitry of an electronic control unit (ECU) for a vehicle, a message;
   determining, by voltage measurement circuitry of the ECU, at least one of a high bus line voltage (VCANH) value and/or a low bus line voltage (VCANL) value for each zero bit of a received message;
   determining, by acknowledge (ACK) circuitry, an initial most frequently measured VCANH value (VfreqH1) and/or an initial most frequently measured VCANL value (VfreqL1) based on a plurality of VCANH and/or VCANL values corresponding to a plurality of received messages;
   determining, by acknowledge (ACK) circuitry, a high ACK threshold voltage (VthH) and/or a low ACK threshold voltage (VthL) based on the VfreqH1 and/or the VfreqL1; and
   determining, by feature set circuitry of the ECU, a value of at least one feature of a feature, the feature set comprising at least one of an operating most frequently measured VCANH value (VfreqH2) of a number of VCANH values and/or an operating most frequently measured VCANL value (VfreqL2) of a number of VCANL values;
wherein the VfreqH2 is determined based on VCANH values less than VthH; and
wherein the VfreqL2 is determined based on VCANL values greater than VthL.

8. The method of claim 7, further comprising identifying, by classifier circuitry of the ECU, a transmitting ECU that transmitted the received message based, at least in part, on the set of feature values.

9. The method of claim 8, further comprising determining, by signature circuitry of the ECU, whether or not the received message was legitimately transmitted by the identified transmitting ECU.

10. The method of claim 7, wherein the feature set comprises VthH and/or VthL, and VthH corresponds to an initial value of the high ACK threshold voltage or an adjusted value of the high ACK threshold voltage and VthL corresponds to an initial value of the low ACK threshold voltage or an adjusted value of the low ACK threshold voltage.

11. The method of claim 7, further comprising determining, by the feature set circuitry, at least one of a first probability (PoutH) that a recently captured VCANH value is greater than VthH and/or a second probability (PoutL) that a recently captured VCANL value is less than VthL.

12. The method of claim 7, wherein the feature set further comprises a moving average of VfreqH2 and a moving average of VthH and/or a moving average of VfreqL2 and a moving average of VthL.

13. A vehicle system comprising:
a plurality of electronic control units (ECUs); and
a communication bus to couple the plurality of ECUs,
each ECU comprising transceiver circuitry to at least one of send and/or receive a message, and
at least one ECU comprising:
voltage measurement circuitry to determine a high bus line voltage (VCANH) value and/or a low bus line voltage (VCANL) value for each zero bit of a received message;
acknowledge (ACK) circuitry to determine, based on a plurality of VCANH and/or VCANL values corresponding to a plurality of received messages, an initial most frequently measured VCANH value (VfreqH1) and/or an initial most frequently measured VCANL value (VfreqL1), the ACK circuitry to further determine a high ACK threshold voltage (VthH) and/or a low ACK threshold voltage (VthL) based on the VfreqH1 and/or the VfreqL1; and
feature set circuitry to determine a value of at least one feature of a feature set, the feature set comprising at least one of an operating most frequently measured VCANH value (VfreqH2) of a number of VCANH values and/or an operating most frequently measured VCANL value (VfreqL2) of a number of VCANL values;
wherein the VfreqH2 is determined based on VCANH values less than VthH; and
wherein the VfreqL2 is determined based on VCANL values greater than VthL.

14. The vehicle system of claim 13, wherein the at least one ECU further comprises classifier circuitry to identify a transmitting ECU that transmitted the received message based, at least in part, on the set of feature values.

15. The vehicle system of claim 14, wherein the at least one ECU further comprises signature circuitry to determine whether or not the received message was legitimately transmitted by the identified transmitting ECU.

16. The vehicle system of claim 13, wherein the feature set comprises VthH and/or VthL, and VthH corresponds to an initial value of the high ACK threshold voltage or an adjusted value of the high ACK threshold voltage and VthL corresponds to an initial value of the low ACK threshold voltage or an adjusted value of the low ACK threshold voltage.

17. The vehicle system of claim 13, wherein the feature set circuitry is further to determine at least one of a first probability (PoutH) that a recently captured VCANH value is greater than VthH and/or a second probability (PoutL) that a recently captured VCANL value is less than VthL.

18. The vehicle system of claim 13, wherein the feature set further comprises a moving average of VfreqH2 and a moving average of VthH and/or a moving average of VfreqL2 and a moving average of VthL.

19. The vehicle system of claim 13, wherein the communication bus complies and/or is compatible with a controller area network (CAN) bus protocol.

* * * * *